UNITED STATES PATENT OFFICE.

HENRY EVEN, OF PEKIN, ILLINOIS.

IMPROVEMENT IN THE MANUFACTURE OF SWEET BISCUITS.

Specification forming part of Letters Patent No. 137,766, dated April 15, 1873; application filed March 3, 1873.

*To all whom it may concern:*

Be it known that I, HENRY EVEN, of the city of Pekin, in the county of Tazewell and State of Illinois, have invented a Dried Rusk or Toast or Dried Sweet Bread or Biscuit; and do hereby declare that the following is a full, clear, and exact description of the ingredients, compounding, and treatment thereof.

This is a sweetish dried bread, rusk, biscuit, or toast, of a nature which partakes of each and all of these articles, and, when properly prepared and baked, and afterward slowly dried in an oven until it becomes crisp, will keep for many months; to be used, as required, either for invalids, for general use, or for shipboard use.

Mix twenty-five pounds of flour with sufficient water to make a dough. Add twenty-five eggs, well beaten, and four quarts of yeast. Work this into a "sponge" and let it "rise" in a warm place until the sponge falls; then melt four pounds of butter and mix with four pounds of sugar and four ounces of salt. Incorporate this with the sponge and let it rise again; then make it into small loaves or cakes about four inches in diameter and about one inch thick. Put these into pans and let them rise the third time, after which bake them in an oven, and, when cool, split them into equal halves and replace them in the oven to dry until they become of a buff color and very crisp—so much so that they will easily crumble into fine fragments in the hand by a little pressure, by which test it is known that they are sufficiently dried and are ready for use.

Quantities of this dried bread may be put away in boxes or cans, where it will keep for many months. It can be eaten in its dried state, and is very palatable so; or it may be immersed a second or two in hot water, which will soften it throughout; or it may be steamed for a minute or two to fit it for the use of invalids or small children.

What I claim as my invention is—

The dried sweet bread or biscuit, composed of the ingredients in the proportions named, and treated in the manner substantially as described.

In testimony that I claim the foregoing dried toast or rusk I have hereunto set my hand this 20th day of February, 1873.

HENRY EVEN.

Witnesses:
 W. A. TINNEY,
 W. H. WAGENSELLER.